(12) United States Patent
Olson et al.

(10) Patent No.: US 7,686,132 B2
(45) Date of Patent: Mar. 30, 2010

(54) POROUS MEMBRANE

(75) Inventors: David A. Olson, St. Paul, MN (US); Gerald L. Van Dam, New Richmond, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 892 days.

(21) Appl. No.: 11/321,189

(22) Filed: Dec. 29, 2005

(65) Prior Publication Data

US 2007/0151800 A1    Jul. 5, 2007

(51) Int. Cl.
    *E04B 1/82* (2006.01)
(52) U.S. Cl. .................. 181/286; 181/290; 181/291
(58) Field of Classification Search ................ 181/286, 181/290, 291
    See application file for complete search history.

(56) References Cited

U.S. PATENT DOCUMENTS

| | | | |
|---|---|---|---|
| 3,532,589 A | 10/1970 | David | |
| 3,971,373 A | 7/1976 | Braun | |
| 4,118,531 A | 10/1978 | Hauser | |
| 4,420,526 A | 12/1983 | Schilling et al. | |
| 4,421,203 A | 12/1983 | Bergamini | ........... 181/284 |
| 4,813,948 A | 3/1989 | Insley | |
| 5,298,694 A | 3/1994 | Thompson et al. | |
| 5,409,573 A | 4/1995 | Weeks | |
| 5,721,177 A | 2/1998 | Frank | |
| 5,824,973 A * | 10/1998 | Haines et al. | ........... 181/286 |
| 5,848,509 A | 12/1998 | Knapp et al. | |
| 5,886,306 A | 3/1999 | Patel et al. | |
| 5,972,147 A | 10/1999 | Janis | |
| 6,062,997 A | 5/2000 | Seymour | ........... 473/578 |
| 6,145,617 A | 11/2000 | Alts | |
| 6,217,691 B1 | 4/2001 | Vair, Jr. et al. | |
| 6,296,075 B1 * | 10/2001 | Gish et al. | ........... 181/290 |
| 6,376,396 B1 | 4/2002 | Thorn et al. | |
| 6,669,265 B2 | 12/2003 | Tilton et al. | |
| 6,720,068 B1 | 4/2004 | Vanbemmel et al. | |
| 6,963,647 B1 | 11/2005 | Krueger et al. | ........... 381/71.5 |
| 2003/0024246 A1 | 2/2003 | Beck et al. | |
| 2003/0066708 A1 * | 4/2003 | Allison et al. | ........... 181/290 |
| 2004/0002274 A1 | 1/2004 | Tilton | |
| 2004/0023014 A1 | 2/2004 | Williamson et al. | |
| 2004/0023586 A1 | 2/2004 | Tilton | |
| 2004/0065507 A1 | 4/2004 | Jacobsen | |

(Continued)

FOREIGN PATENT DOCUMENTS

FR    2 585 747    6/1987

(Continued)

*Primary Examiner*—Jeffrey Donels
*Assistant Examiner*—Jeremy Luks
(74) *Attorney, Agent, or Firm*—Kenneth B. Wood

(57) ABSTRACT

A new acoustic insulating sheet material comprises in laminar assembly a) a primary sound absorbing sheet, and b) a dense porous membrane that i) has an air-flow resistance of about 5000 rayls or less and ii) has an Acoustic Value Ratio as defined herein of at least 3000. Preferably, the membrane is about 200 micrometers or less in thickness, and more preferably is about 150 micrometers or less in thickness. Also, the Acoustic Value Ratio is preferably at least 7,000. The described membrane can also be used alone to acoustically insulate a space, e.g., by mounting it in planar array over an air gap and in position to attenuate noise from a noise source.

20 Claims, 3 Drawing Sheets

U.S. PATENT DOCUMENTS

| | | |
|---|---|---|
| 2004/0077247 A1 | 4/2004 | Schmidt et al. |
| 2004/0121110 A1 | 6/2004 | Schmidt et al. |
| 2004/0131836 A1* | 7/2004 | Thompson ............... 428/304.4 |
| 2004/0231915 A1* | 11/2004 | Thompson et al. .......... 181/290 |
| 2005/0014825 A1 | 1/2005 | Yam |

FOREIGN PATENT DOCUMENTS

| | | |
|---|---|---|
| GB | 2 322 862 | 9/1998 |
| JP | 59-186750 | 10/1984 |
| JP | 9-76387 | 3/1997 |
| WO | WO 98/18657 | 5/1998 |
| WO | WO 02/09089 | 1/2002 |
| WO | WO 02/098707 | 12/2002 |
| WO | WO 03/078714 | 9/2003 |
| WO | WO 2004/022645 | 3/2004 |

* cited by examiner

US 7,686,132 B2

POROUS MEMBRANE

FIELD OF THE INVENTION

This invention relates to thin porous membranes used for acoustic insulation, often in combination with another generally thicker web of insulation.

BACKGROUND OF THE INVENTION

Some acoustic insulation tasks are best performed with a combination of a primary, relatively thick fibrous sheet and a secondary, thinner sheet or membrane (the term "membrane" means herein a thin sheet). In combination, the primary sheet and membrane reduce noise better than the primary sheet would by itself; for example, inclusion of the membrane can often enhance reduction of noise in lower frequency ranges. In addition, the membrane can offer physical protection for the primary sheet.

Membranes can also be used by themselves, mounted in a planar array over an air space (i.e., with the film stretched in a flat or curved plane over the air space or air gap). When positioned in a room or other enclosure in which it is desired to reduce noise, with an air gap of appropriate thickness behind the membrane, the membrane functions to absorb sounds in the enclosure.

A composite insulation of a thick primary insulating sheet and a secondary membrane-like sheet is described, for example, in Thorn et al., U.S. Pat. No. 6,376, 396, which teaches as the membrane-like sheet a nonwoven web compacted in two sequential operations—a first stage of mechanical compaction (such as by needle-tacking or hydroentangling) and a second stage of compaction by heat and pressure with presses or calenders. Increased sound absorption is said to occur as a result of the second compaction.

Another prior art teaching is Tilton, U.S. Patent Application Publication No. US 2004/0002274 A1, which teaches building panels, ceiling tiles, or similar building components in which a decorative fabric previously used to cover the exterior of the building component is replaced by a densified facing layer of polyester fibers. The densified facing layer, which is printed with aesthetically pleasing graphics or other indicia, is said to reduce costs and also to provide improved insulating properties.

See also Vanbemmel et al., U. S. Pat. No. 6,720,068, which focuses on a multilayered product or laminate useful as sound-absorbing insulation for automobiles. Recognizing a need for the insulation to be cheap, thin and lightweight, the patent describes a product comprising a backing layer—an open-cell foam or a sparingly compacted nonwoven fibrous web—coated with an extremely thin layer of microfibers (col. 2, ll. 7-9). The coating of microfibers "attains a thickness of only 0.2 to 1.0 mm, and in particular 0.3 to 0.7 mm and has a weight per unit area of 20 to 200 g/m$^2$, and in particular 30 to 100 g/m$^2$"(col. 1, ll. 62-64). There is no specific example or similar description in the patent of a laminate of the Vanbemmel invention.

Another commercial form of insulation uses a membrane-like sheet that comprises a multilayer sheet such as a spunbond-meltblown-spunbond laminate (SMS) point bonded with heat and pressure and assembled in combination with a primary insulating sheet.

A disadvantage with each of the described prior insulation composites is that in order to add desired levels of sound insulation to the composite the membrane-like secondary sheet is thick enough and heavy enough to add undesired cost and weight to the overall insulation package.

SUMMARY OF THE INVENTION

By the present invention a new membrane is provided that is of lower cost and often simpler construction than prior membranes while offering at least equal insulation performance. A preferred membrane comprises a highly densified nonwoven fibrous web, for example, a web prepared by compacting a nonwoven starting sheet material to a very thin thickness, preferably less than 200 micrometers. The new membranes are dense, but retain a porosity effective for attenuating sound; generally porosity is sufficient that the specific airflow resistance of the membrane is no more than about 10,000 rayls, and for a broader utility is no more than about 5000 rayls (the industry commonly refers to "specific airflow resistance" simply as "airflow resistance" and that practice will be followed herein; the same property is also sometimes referred to as "acoustic resistance," e.g., when the focus is on sound insulation; the same test procedure, described subsequently herein, is used to measure both airflow resistance and acoustic resistance; the units for the measured property are reported herein as rayls in the mks system; other units used in the industry include Ns/m$^3$ and Pa·s/m).

We have found that useful membranes can be defined by summarizing the characteristics of density, thickness and porosity in a new relationship, termed Acoustic Value Ratio, which relates solidity (a dimensionless fraction that states the proportion of the volume of the membrane occupied by the solid constituents of the membrane), porosity (i.e., airflow resistance or acoustic resistance) in rayls, and the thickness of the membrane, as follows:

$$\text{Acoustic Value Ratio} = \frac{\text{(porosity in rayls) (solidity)}}{\text{thickness in millimeters}}$$

We have found that a porous membrane that exhibits an Acoustic Value Ratio (AVR) of at least 3000 makes possible acoustic insulation performance of high quality, while adding little cost and weight to the overall insulation material. Preferably the Acoustic Value Ratio is at least 7,000. Also, the membrane preferably is no more than about 150 micrometers in thickness; in other words, surprisingly thin membranes are useful and desirable.

A membrane as described can be used in laminar assembly with a primary sound absorbing sheet to prepare a surprisingly effective sound insulation. In addition to its use in a composite insulation, a membrane as described can function to provide sound attenuation by itself when arranged in planar array with an air gap or air space behind the membrane.

DETAILED DESCRIPTION

Figure 1:
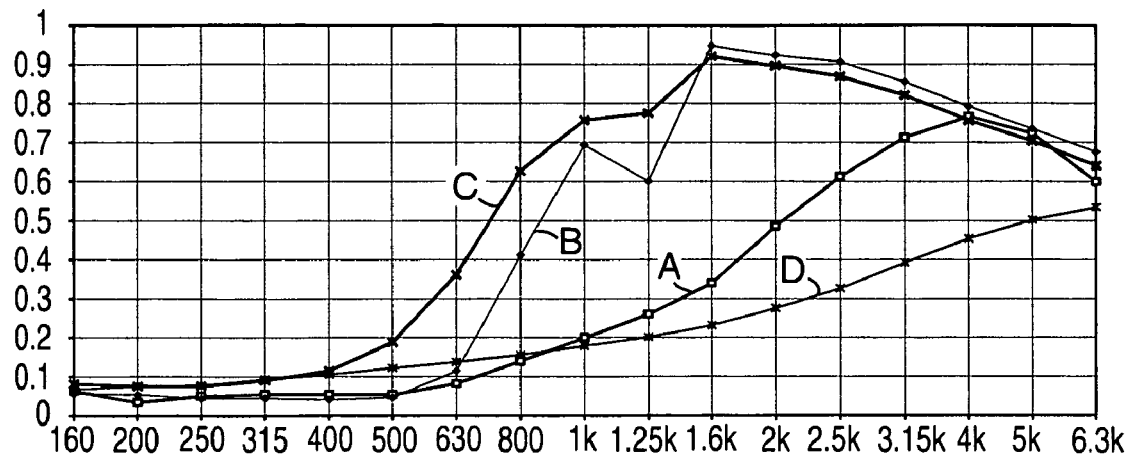
FIGS. 1-9 are plots of sound absorption coefficient versus frequency for representative membranes of the invention and of comparative webs.
Figure 2:
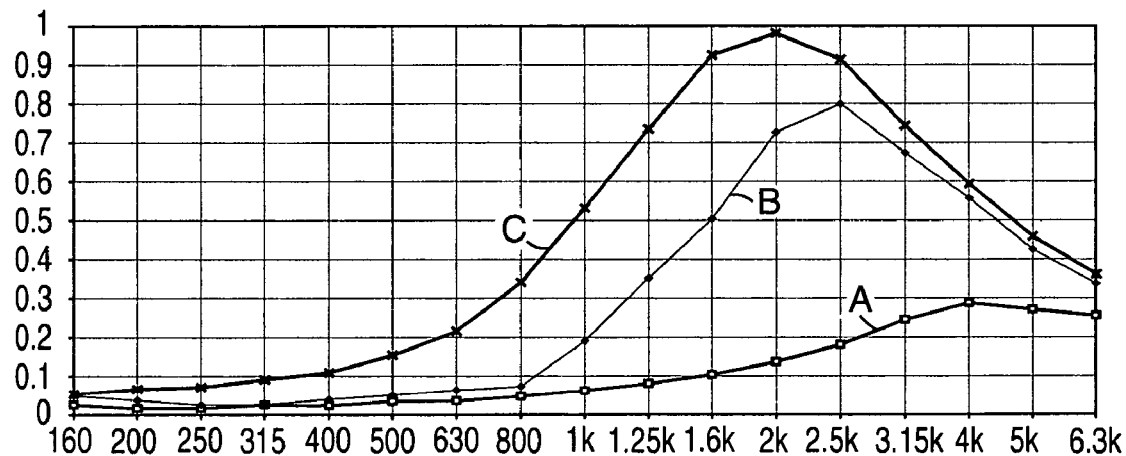
Figure 3:
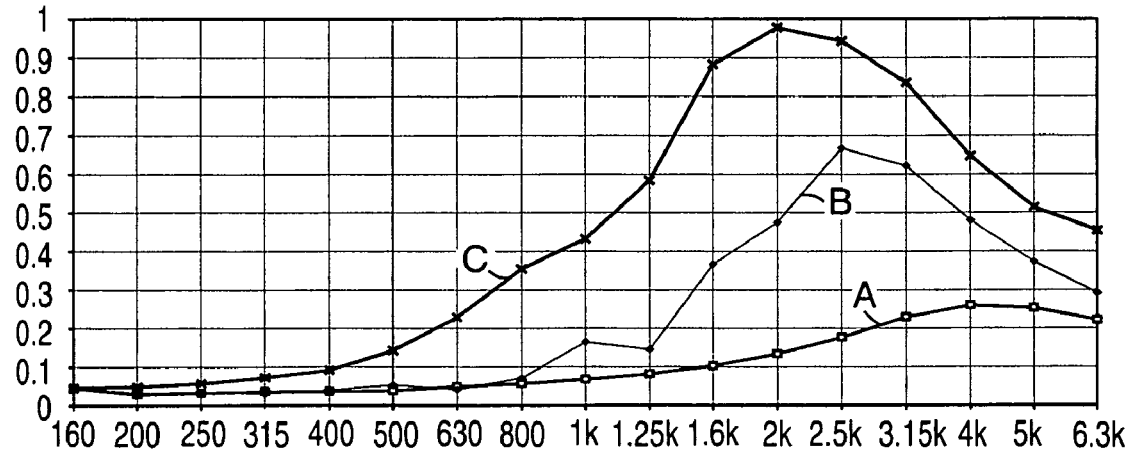
Figure 4:
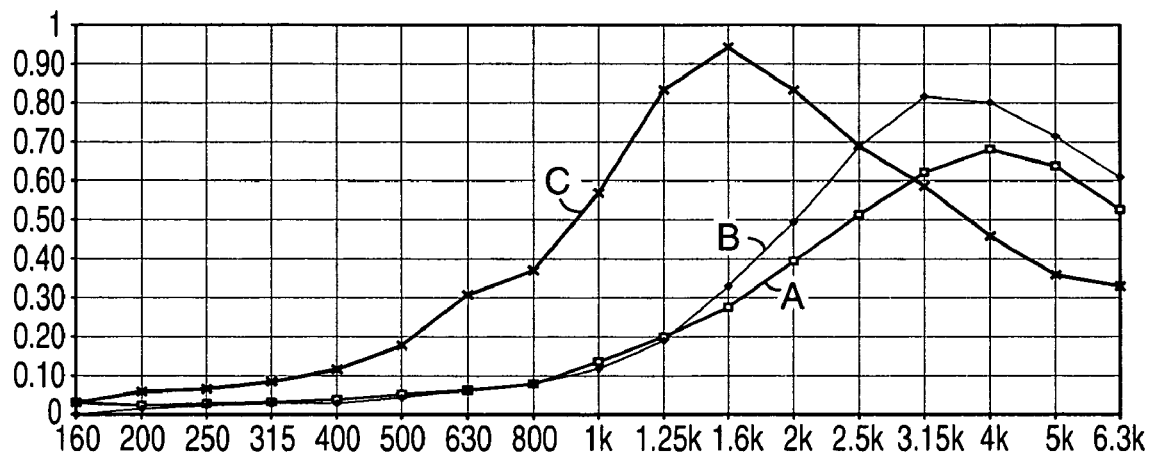
Figure 5:
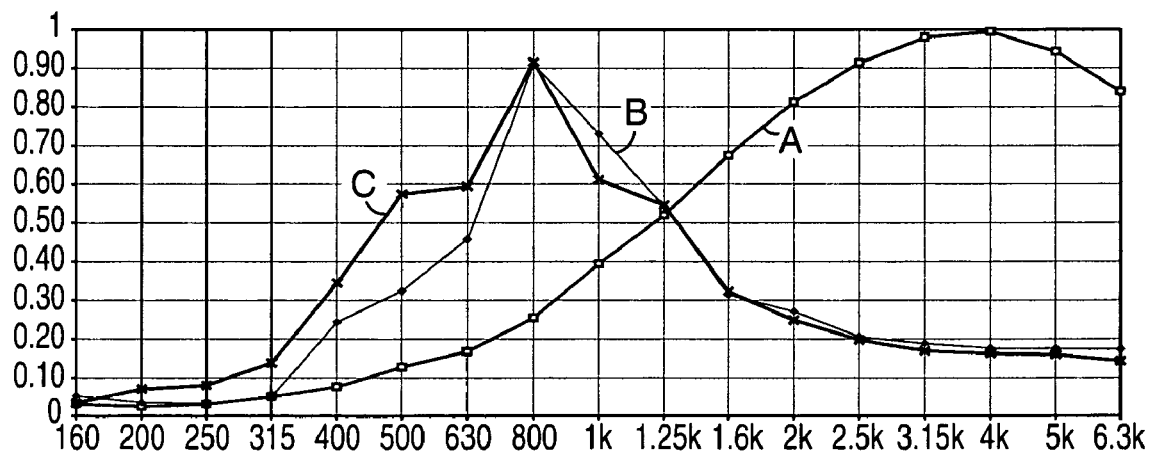
Figure 6:
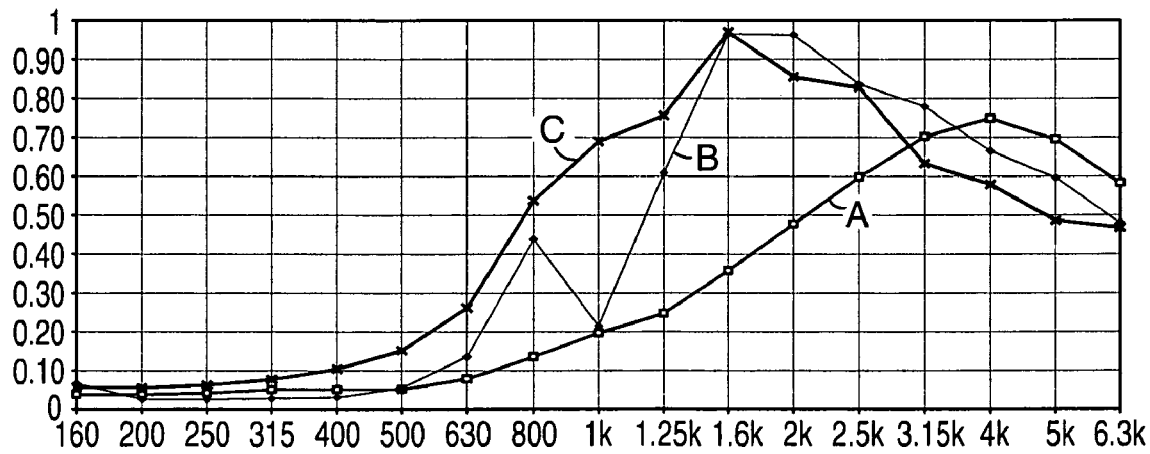
Figure 7:
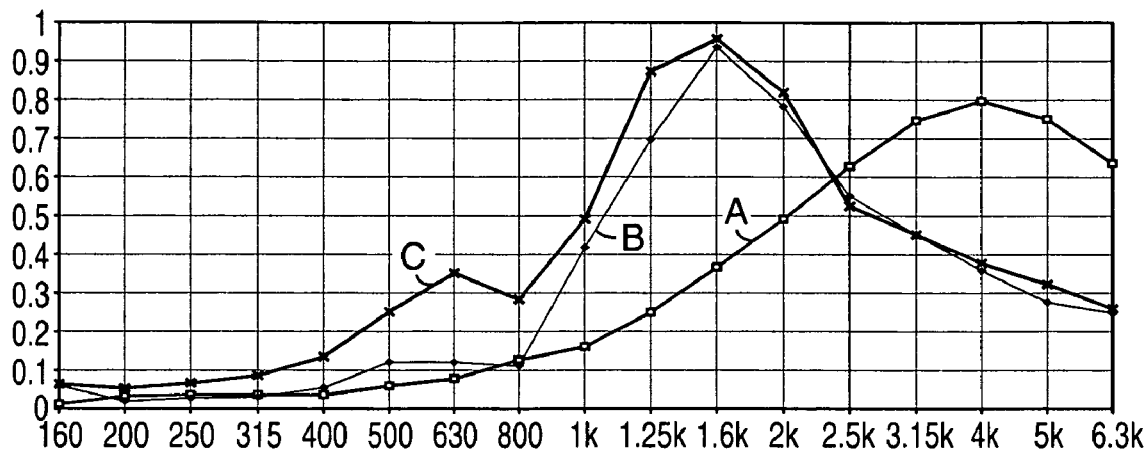
Figure 8:
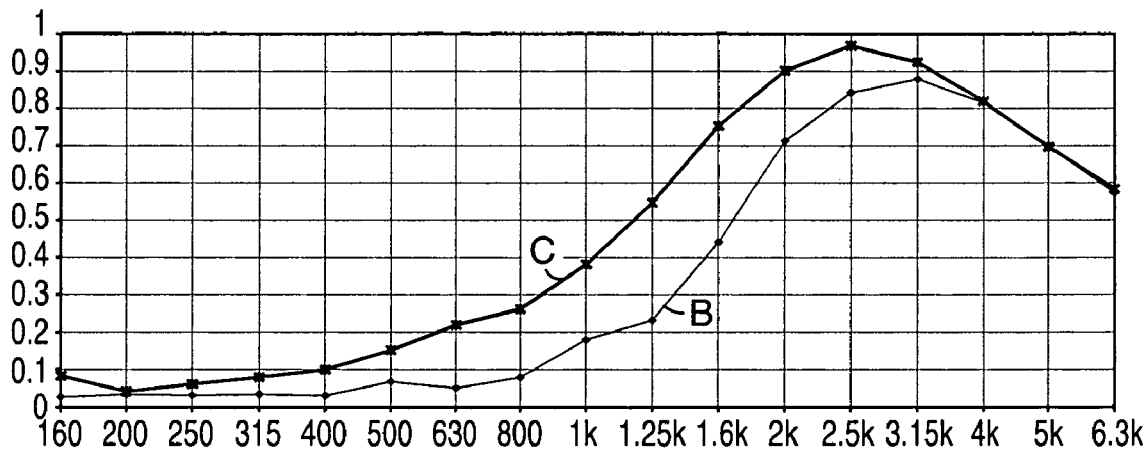

A fibrous web is preferably used as the starting sheet material for preparation of a membrane of the invention. Any of a variety of conventional well-known forms of web can be used, including spunbond webs (generally comprising melt-spun fibers that are cooled, drawn, collected on a forming surface in a random isotropic manner as a loosely entangled web, and then bonded as by calendering or through-air bonding); meltblown webs (formed by extruding molten thermoplastic polymer through a row of orifices in a die into a high-velocity air stream, where the extruded polymer streams are attenuated into generally fine-diameter fibers—often averaging 10 micrometers or less in diameter—and carried to a collector where the fibers collect as a coherent entangled web); spunlaced webs (generally dry-laid webs that have been hydroentangled); carded or air-laid staple fiber webs; woven webs; wet-laid webs; and combinations of such webs. The webs are often in a self-sustaining form, but also can be rather loose and only made self-sustaining during the web-densification used to prepare a membrane of the invention.

Membranes of the invention can also be prepared from other porous sheet materials such as open-celled foams or netting. In general, any porous thermoplastic sheet material is a candidate for use as a starting sheet material for preparing a membrane of the invention.

A starting sheet material for use in the invention should generally be softenable by heat. Generally any thermoplastic polymeric material that can be formed into fibers or other useful web form can be used. Most typically, the polymers selected are those commonly used in fiber formation such as polyethylene, polypropylene, polyethylene terephthalate, nylon, and urethanes. Elastic materials are useful and offer advantages in conformability, flexibility and moldability. Blends of materials may be used, including blends of polymers as well as polymeric materials into which additives have been blended, such as pigments or dyes. Also, the starting sheet material may include bicomponent fibers, such as core-sheath or side-by-side bicomponent fibers ("bicomponent" herein includes fibers with two or more components).

Different materials such as fibers of different materials may be combined so as to prepare a blended web. For example, staple fibers may be blended into meltblown fibers in the manner taught in U.S. Pat. No. 4,118,531; or particulate material may be introduced and captured within a web in the manner taught in U.S. Pat. No. 3,971,373; or microwebs as taught in U.S. Pat. No. 4,813,948 may be blended into a web. Webs that are a blend of thermoplastic fibers and other fibers such as wood pulp fibers may also be used, though introduction of non-thermoplastic material is generally less desirable.

Although the invention can advantageously be practiced with a web that comprises a single unitary layer, a starting sheet material for use in the invention may also comprise more than one layer. For example, SMS (spunbond/meltblown/spunbond) webs may be used, as can webs that combine other fibrous layers, e.g., layers that differ according to the diameter of fibers used in the layers, thereby providing gradations of fiber diameter or porosity.

A membrane of the invention is typically prepared by densifying a starting sheet material with a calender under heat and pressure. Well known calendering procedures may be used. Usually the rolls of the calender are smooth surfaced, but rolls carrying low-relief projections can be used, e.g., to achieve point bonding of a web or sheet. Sufficient heat and pressure are used to compact the sheet causing deformation and/or melting of the sheet material, but heating conditions that would cause sheet material to flow so as to completely plug pores should be avoided. Stretching or heating of a sheet may be used to re-open overly closed openings or to enlarge overly narrow openings.

A membrane of the invention can be tuned to better attenuate particular ranges of frequency by adjusting the degree of porosity left in the membrane after calendering. For example, a membrane having an airflow resistance of 5000 to 6000 rayls may best attenuate sounds having a frequency of 400-1000 hertz. To have more effectiveness over a broader and higher range of frequencies the porosity of the calendered or densified membrane will best have an airflow resistance less than about 2000, or even about 1000 or less.

As a corollary to thinness, a membrane of the invention also generally has a low basis weight, i.e., preferably about 100 grams per square meter or less, and more preferably about 50 grams per square meter or less. A main criterion in selecting a starting material is to achieve good continuity or uniformity of the finished membrane. Good membrane properties often can be obtained irrespective of the diameter of fibers in a starting sheet material. However, microfiber webs can be of advantage, e.g., starting material webs in which the microfibers average 10 micrometers or less in diameter, such webs are usually meltblown webs. Fiber diameter can be determined using actual visually measured diameter as with a scanning electron micrograph (SEM). Another fiber diameter measurement is "effective fiber diameter" (EFD) measured by a procedure as described in U.S. Pat. No. 5,298,694 (col. 2, lines 35-43 and col. 12, lines 33-39). For ease of description, EFD measurements are used herein in the examples. An advantage of the invention is that low-cost starting materials may be used to achieve useful membrane properties.

The primary sound absorbing sheet used in laminar assembly with a membrane of the invention can be generally any of the known sound insulating sheet materials, including, preferably, a web comprising microfibers and crimped staple fibers blended therein, as taught, for example, in U.S. Pat. No. 5,298,694. Other useful sound absorbing sheet materials include open-cell foams.

Generally, products of the invention are marketed as the membrane by itself or as sheet goods comprising a laminar assembly of membrane and primary sound absorbing sheet. However, products of the invention can also be marketed in other ways, e.g., as a molded article of membrane and primary insulating sheet shaped for a particular application.

Test Procedures

Tests that define webs of the invention and measure their performance are as follows.

Specimen solidity is determined by dividing the bulk density of a specimen (usually a fibrous web) by the density of the materials making up the specimen (web). Bulk density of a web specimen is determined by first measuring the weight and thickness of a 10-cm-by-10-cm section of web. Thickness of the specimen is evaluated as prescribed in the ASTM D 5729 standard test method, modified by using a mass of 150 grams to exert a pressure of 0.4213 lb/in$^2$ (2.9 kPa/m$^2$) onto the face of each sample. When the size of the sample is limited to something less than the size recommended in ASTM D 5729 the mass on the pressure foot is proportionately reduced to maintain a loading force of 0.4213 lb/in$^2$ (2.9 kPa/m$^2$). The specimens are first preconditioned at 22+/−5° C. and in an atmosphere of 50% +/−5% relative humidity. Dividing the weight of the specimen in grams by the sample area in square centimeters derives the basis weight of the specimen, which is reported in g/m$^2$. The bulk density of the web is determined by dividing the basis weight by the thickness of the specimen and is reported as g/m$^3$. Solidity is a dimensionless fraction representing the proportion of solids content in a given specimen, calculated by dividing the bulk density of the specimen by the density of the material composing the specimen. (The density of a polymer can be measured by standard means if the supplier does not specify material density.)

Airflow resistance is evaluated as prescribed in the ASTM C 522 standard test method. Values of specific airflow resistance, r, are reported as mks rayl (Pa·s/m). Samples were prepared by die cutting a 5.25-inch-diameter (13.33 cm) circular sample. If edges are slightly compressed from the die cutting operation, edges must be returned to original or natural thickness before testing. The preconditioned samples were placed in a specimen holder, and the pressure difference was measured over a 100 cm² face area.

Sound absorption of acoustic materials is determined by the test method described in ASTM designation E 1050-98, titled "Impedance and Absorption Using A Tube, Two Microphones and A Digital Frequency Analysis System." The preconditioned samples were tested using a 29-millimeter-diameter tube. The ⅓ octave band sound absorption coefficients from 160 to 6300 hertz were reported. For Examples 9-11 the samples were tested using a 63-millimeter-diameter tube. The ⅓ octave band sound absorption coefficients from 100 to 3150 hertz were reported.

EXAMPLES 1-8

A variety of membranes of the invention were prepared and tested, as summarized in Tables 1-3 and in plots of data in FIGS. 1 to 8. The starting sheet material for each of the membranes in the examples was as follows:

For Example 1, a spunbond nylon web (#G066380 supplied by Western Nonwovens).

For Example 2, a spunbond polypropylene web (#83149006-01 supplied by BBA Nonwovens).

For Example 3, a spunbond PET web (polyethylene terephthalate—Reemay Fabric, supplied by BBA Nonwovens).

For Example 4, a meltblown polypropylene web containing fibers averaging 8 micrometers in diameter (EFD); the average actual diameter of the microfibers was less than about 10 micrometers.

For Example 5, a meltblown polyurethane web of fibers having an average (EFD) diameter of 20 micrometers.

For Example 6, a composite web of 65 weight % meltblown polypropylene fibers averaging (EFD) 8 micrometers in diameter and 35 weight % Veratec "Easy Street" cotton staple fibers.

For Example 7, a spunlaced web comprising 95 weight % Kurraray W102 3.4-denier splittable composite fibers, each fiber comprising about 50% PET and 50% nylon, and 5 weight % KoSa Type-254 2-denier crimped "Melty" bicomponent fibers.

For Example 8, a carded web containing Type 196 1.9-denier, 1.5-inch-long polypropylene fibers supplied by Fiber Vision.

The described starting sheet materials were calendered between two smooth rollers under conditions as summarized in Table 2.

Tests were performed on the finished membranes of the invention and starting sheet materials alone and on the membrane in combination with a thicker carded-web sheet material, (20 mm thick) not generally used for sound insulation to illustrate the improvement gained by combining such a sheet material with a membrane of the invention (the thicker web was a blend of 85 weight percent 2-denier crimped staple fibers and 15 weight percent 2-denier crimped "Melty" bicomponent fibers with a latex binder applied in a weight of 7 g/m²). Results for airflow resistance and web solidity are presented in Table 1 for the starting sheet material and in Table 3 for the completed membrane.

The sound absorption measurements for the various test samples are presented in FIGS. 1-8. In these figures, frequency in hertz is plotted on the abscissa and sound absorption coefficient is plotted on the ordinate. FIG. 1 presents the data for the test webs of Example 1, FIG. 2 for Example 2, and so on through FIG. 8 and Example 8. In each of FIGS. 1-8, Plot A is for the starting sheet material measured with a 20 milimeter air gap; Plot B is for the calendered membrane of the invention measured with a 20 millimeter air gap; and Plot C is for a laminar assembly of the calendered membrane of the invention and the above-described 20 millimeter thicker web. In FIG. 1 Plot D is data for the thicker web alone. There is no Plot A in FIG. 8 because sound absorption was not measured on the uncalendered starting sheet material of that example.

EXAMPLES 9-11

Figure 9:
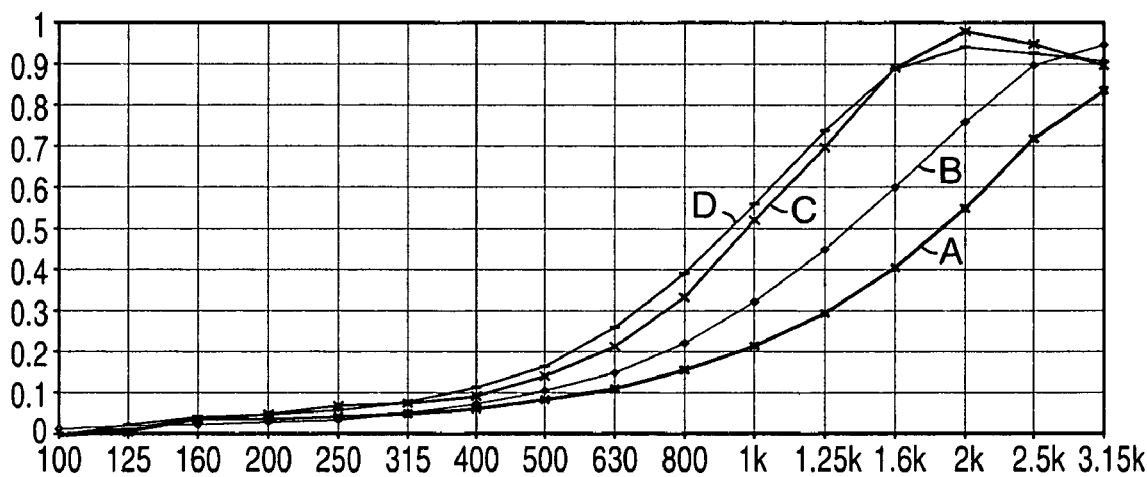

Examples 9-11 were prepared from a polypropylene SMS (spunbond/meltblown/spunbond web) that had a basis weight of 17 grams/square meter (0.5 oz/yd²) supplied by First Quality Nonwovens (FQN) as SM1700008. The described web was calendered between two smooth steel rolls using different conditions for each of Examples 9-11 as set forth in Table 2. Measurements and tests were conducted on the starting sheet material and completed membrane and results are presented in Tables 1 and 3. Sound absorption measurements were performed on the test membranes in combination with a useful acoustic insulating sheet material (Thinsulate™ Acoustic Insulation supplied by 3M, hereafter TAI, and as described in U.S. Pat. No. 5,298,694) which comprised 55 weight percent meltblown fibers and 35 weight percent crimped staple fibers. For further comparison, sound absorption measurements were performed on a laminar assembly (Comparative Example C1) comprising a commercial web weighing 51 grams per square meter (a polypropylene SMS web available from Kimberly Clark as SM150) and the acoustic insulating sheet material supplied by 3M (TAI). Further description of the SMS web of Comparative Example C1 and the TAI web are presented in Table 1. Sound absorption measurements are presented in FIG. 9, where Plot A is for the TAI web alone; Plot B is for a laminar assembly of the uncalendered starting sheet material and the TAI web; Plot C is for a laminar assembly of the completed calendered membrane of Example 11 and the TAI web; and Plot D is for Comparative Example C1.

In reviewing the test results it is noted that for improvement over a broad spectrum of frequencies, as illustrated especially by Examples 2, 3, and 8, as well as Examples 9-11, the airflow resistance of the completed membrane is less than 1500 rayls and even less than 1000 rayls, suggesting a desired range of airflow resistance for such broad-spectrum improvement. From a separate standpoint, the weight of the membrane in Examples 2, 3, and 8 is less than 50 g/m², and in Example 9-11, is less than 20 g/m², and the thickness is less than 100 micrometers and in five cases is less than 50 micrometers; and the Acoustic Value Ratio is 7,000 or more, and in several examples is 10,000 or more.

TABLE 1

| | Starting Sheet Material Properties | | | | |
|---|---|---|---|---|---|
| Example No. | Basis Weight (g/m²) | Thickness (mm) | Airflow Resistance (rayls) | Solidity (dimensionless) | Acoustic Value Ratio |
| 1 | 73 | 0.2184 | 163 | 0.29 | 218 |
| 2 | 29 | 0.2007 | 32 | 0.16 | 25 |
| 3 | 29 | 0.2007 | 32 | 0.16 | 25 |
| 4 | 19 | 0.1651 | 126 | 0.13 | 97 |
| 5 | 182 | 0.6350 | 457 | 0.24 | 172 |
| 6 | 58 | 1.1430 | 153 | 0.05 | 7 |

TABLE 1-continued

Starting Sheet Material Properties

| Example No. | Basis Weight (g/m²) | Thickness (mm) | Airflow Resistance (rayls) | Solidity (dimensionless) | Acoustic Value Ratio |
|---|---|---|---|---|---|
| 7 | 58 | 0.4445 | 167 | 0.10 | 39 |
| 8 | 27 | Not Measurable - No Web Intergrity until Treated | | | |
| 9 | 17 | 0.1233 | 125 | 0.15 | 156 |
| 10 | 17 | 0.1233 | 132 | 0.15 | 164 |
| 11 | 17 | 0.1233 | 125 | 0.15 | 156 |
| C1 | 51 | 0.3400 | 925 | 0.17 | 451 |
| TAI | 200 | 16 | 423 | 0.01 | 0.32 |

TABLE 2

Calender Conditions

| Example No. | Calender Surface Temperature (top roll/bottom roll in °C.) | Pressure (pounds/lineal inch) | Calender Surface Speed (feet/min; m/min) |
|---|---|---|---|
| 1 | 87.2/87.8 | 1963 | 15 (4.6) |
| 2 | 87.2/87.8 | 1963 | 15 (4.6) |
| 3 | 87.2/87.8 | 2355 | 15 (4.6) |
| 4 | 88.3/88.3 | 589 | 15 (4.6) |
| 5 | 86.1/87.2 | 589 | 15 (4.6) |
| 6 | 88.3/88.3 | 196 | 15 (4.6) |
| 7 | 87.2/87.8 | 1812 | 15 (4.6) |
| 8 | 122.2/124.4 | 844 | 30 (9.2) |
| 9 | 108/108 | 327 | 10 (3) |
| 10 | 108/108 | 436 | 10 (3) |
| 11 | 108/108 | 873 | 10 (3) |
| C1 | N/A | N/A | N/A |
| TAI | N/A | N/A | N/A |

TABLE 3

Densified Membrane Material Properties

| Example No. | Basis Weight (g/m²) | Thickness (mm) | Airflow Resistance (rayls) | Solidity (dimensionless) | Acoustic Value Ratio |
|---|---|---|---|---|---|
| 1 | 86 | 0.1372 | 940 | 0.55 | 3772 |
| 2 | 32 | 0.0546 | 748 | 0.65 | 8890 |
| 3 | 20 | 0.0318 | 800 | 0.48 | 12038 |
| 4 | 19 | 0.0368 | 664 | 0.58 | 10379 |
| 5 | 223 | 0.3835 | 5943 | 0.48 | 7507 |
| 6 | 56 | 0.1384 | 1595 | 0.40 | 4652 |
| 7 | 59 | 0.0737 | 3666 | 0.64 | 31659 |
| 8 | 26 | 0.0495 | 792 | 0.57 | 9170 |
| 9 | 17 | 0.0410 | 816 | 0.46 | 9193 |
| 10 | 17 | 0.0410 | 1036 | 0.46 | 11671 |
| 11 | 17 | 0.0360 | 1397 | 0.53 | 20496 |
| C1 | N/A | N/A | N/A | N/A | N/A |
| TAI | N/A | N/A | N/A | N/A | N/A |

What is claimed is:

1. An acoustic insulating sheet material comprising in laminar assembly a) a primary sound absorbing sheet, and b) a dense, porous self-sustaining membrane about 200 micrometers or less in thickness that i) has an airflow resistance of about 10,000 rayls or less and ii) has an Acoustic Value Ratio of at least 3000.

2. A sheet material of claim 1 in which the membrane has a basis weight of 100 g/m² or less.

3. A sheet material of claim 1 in which the membrane has an airflow resistance of 5000 rayls or less.

4. A sheet material of claim 1 in which the membrane comprises at least two distinctive layers of fibers.

5. A sheet material of claim 1 in which the membrane comprises a densified SMS sheet.

6. A sheet material of claim 1 in which the membrane has a thickness of 150 micrometers or less.

7. A sheet material of claim 1 in which the membrane has an Acoustic Value Ratio of at least 7,000.

8. A sheet material of claim 1 in which the membrane has a thickness of 150 micrometers or less and an Acoustic Value Ratio of at least 7,000.

9. A sheet material of claim 1 in which the membrane has a thickness of about 50 micrometers or less.

10. A sheet material of claim 1 in which the membrane has a basis weight of 50 g/m² or less.

11. A sheet material of claim 9 in which the membrane has a basis weight of 50 g/m² or less.

12. An acoustic insulating sheet material comprising in laminar assembly a) a primary sound absorbing sheet, and b) a dense porous fibrous self-sustaining membrane that i) is about 200 micrometers or less in thickness, ii) has a basis weight of 100 g/m² or less, iii) has an airflow resistance of about 5000 rayls or less and iv) has an Acoustic Value Ratio of at least 7,000.

13. A sheet material of claim 12 in which the membrane is 150 micrometers or less in thickness.

14. A sheet material of claim 12 in which the membrane has an Acoustic Value Ratio of at least 10,000.

15. A sheet material of claim 12 in which the membrane has an airflow resistance of about 2000 rayls or less.

16. A sheet material of claim 12 in which the membrane comprises a densified SMS sheet.

17. A method for acoustically insulating a space comprising mounting a membrane in a planar array over an air gap and in position to attenuate noise from a noise source, the membrane being a dense porous self-supporting membrane having a thickness of 200 micrometers or less, an airflow resistance of about 5000 rayls or less and an Acoustic Value Ratio of at least 3000.

18. A method of claim 17 in which the membrane has a thickness of about 150 micrometers or less.

19. A method of claim 17 in which the membrane has an Acoustic Value Ratio of at least 7,000.

20. A method of claim 17 comprising mounting a more lofty nonwoven fibrous sheet material in laminar assembly with the membrane.

* * * * *